US011244481B2

(12) United States Patent
Atria et al.

(10) Patent No.: US 11,244,481 B2
(45) Date of Patent: Feb. 8, 2022

(54) MULTI-SCALE IMAGE RECONSTRUCTION OF THREE-DIMENSIONAL OBJECTS

(71) Applicant: nView medical Inc., Salt Lake City, UT (US)

(72) Inventors: Cristian Atria, Salt Lake City, UT (US); Devi Ayyagari, Salt Lake City, UT (US); Justina Wunderlich, Salt Lake City, UT (US)

(73) Assignee: nView medical Inc., Salt Lake City, UT (US)

( * ) Notice: Subject to any disclaimer, the term of this patent is extended or adjusted under 35 U.S.C. 154(b) by 106 days.

(21) Appl. No.: 16/572,479

(22) Filed: Sep. 16, 2019

(65) Prior Publication Data

US 2020/0090384 A1 Mar. 19, 2020

Related U.S. Application Data

(60) Provisional application No. 62/731,652, filed on Sep. 14, 2018.

(51) Int. Cl.
*G06K 9/00* (2006.01)
*G06T 11/00* (2006.01)
(Continued)

(52) U.S. Cl.
CPC ........... *G06T 11/006* (2013.01); *B25J 9/1697* (2013.01); *G06T 7/97* (2017.01); *G06T 2207/10088* (2013.01); *G06T 2207/10116* (2013.01)

(58) Field of Classification Search
CPC ... G06T 11/003; G06T 17/00; G06T 2200/08; G06T 2207/10116; G06T 11/006; B25J 9/1697
See application file for complete search history.

(56) References Cited

U.S. PATENT DOCUMENTS 5,644,662 A * 7/1997 Vuylsteke ................. G06T 5/10
382/132
6,118,841 A 9/2000 Lai.
(Continued)

FOREIGN PATENT DOCUMENTS

CN 107157503 A 9/2017
JP 3697449 A 3/2004
(Continued)

OTHER PUBLICATIONS

PCT Application No. PCT/US19/51355 Filing date Sep. 16, 2019, Cristian Atria International Search Report dated Jan. 6, 2020, 12 Pages.
(Continued)

*Primary Examiner* — Sean M Conner
(74) *Attorney, Agent, or Firm* — Thorpe North & Western

(57) ABSTRACT

A technology for reconstructing an image of a three-dimensional object. In one example, a projection image dataset can be obtained from an imaging data detector and a reduced image dataset that has a lower quantity of data as compared to a quantity of data of the projection image dataset can be generated from the projection image dataset. An image remainder dataset can be generated to indicate an image difference between the projection image dataset and the reduced image dataset. A first scale image reconstruction of the three-dimensional object can be generated using the reconstruction technique and the reduced image dataset, and a second scale image reconstruction of the three-dimensional object can be generated using the iterative reconstruction technique and the image remainder dataset. In another example, a first scale image reconstruction of the three-dimensional object can be generated using a low-resolution reconstruction technique, and a second scale image reconstruction of the three-dimensional object can be generated by from an image dataset that compares the projection (Continued)

imaging dataset with the virtual projection of the first low-resolution reconstruction. A multi-scale image reconstruction of the three-dimensional object can be generated using a reconstruction technique and the first scale image reconstruction and the second scale image reconstruction.

26 Claims, 10 Drawing Sheets

(51) Int. Cl.
*G06T 7/00* (2017.01)
*B25J 9/16* (2006.01)

(56) References Cited

U.S. PATENT DOCUMENTS

| | | | |
|---|---|---|---|
| 6,418,243 B1* | 7/2002 | Skoglund | G06T 11/003 |
| | | | 345/419 |
| 6,970,585 B1 | 11/2005 | Dafni et al. | |
| 7,085,343 B2 | 8/2006 | Shinmo et al. | |
| 7,840,066 B1* | 11/2010 | Chen | G06T 5/40 |
| | | | 382/168 |
| 9,057,678 B2 | 6/2015 | Lee et al. | |
| 2002/0181797 A1* | 12/2002 | Young | G06T 5/009 |
| | | | 382/260 |
| 2005/0089822 A1* | 4/2005 | Geng | G06F 30/00 |
| | | | 433/215 |
| 2006/0285741 A1* | 12/2006 | Subbarao | H04N 13/207 |
| | | | 382/154 |
| 2009/0274265 A1 | 11/2009 | Koehler et al. | |
| 2010/0220911 A1* | 9/2010 | Bertens | G06T 5/008 |
| | | | 382/131 |
| 2010/0322525 A1* | 12/2010 | Kohli | G06K 9/6297 |
| | | | 382/226 |
| 2011/0058724 A1* | 3/2011 | Claus | A61B 6/025 |
| | | | 382/132 |
| 2013/0027386 A1* | 1/2013 | Small | G06F 3/04815 |
| | | | 345/419 |
| 2013/0101191 A1* | 4/2013 | Zamyatin | A61B 6/5258 |
| | | | 382/131 |
| 2013/0147785 A1* | 6/2013 | Patiejunas | G06T 15/04 |
| | | | 345/419 |
| 2013/0163836 A1* | 6/2013 | Pau | G06T 7/62 |
| | | | 382/128 |
| 2013/0249901 A1* | 9/2013 | Sweet | G06T 17/00 |
| | | | 345/419 |
| 2013/0322779 A1* | 12/2013 | Noda | G06T 5/20 |
| | | | 382/263 |
| 2014/0009156 A1 | 1/2014 | Doneva et al. | |
| 2014/0112588 A1 | 4/2014 | Yelton | |
| 2016/0171723 A1 | 6/2016 | Claus et al. | |
| 2017/0103549 A1 | 4/2017 | Cherubini et al. | |
| 2017/0132836 A1* | 5/2017 | Iverson | G06T 17/10 |
| 2017/0132837 A1* | 5/2017 | Iverson | G06T 17/10 |
| 2017/0164910 A1 | 6/2017 | Cao et al. | |
| 2017/0164919 A1 | 6/2017 | Surgivisio | |
| 2017/0258432 A1 | 9/2017 | Choi et al. | |
| 2017/0332983 A1 | 11/2017 | Tai et al. | |
| 2018/0137689 A1* | 5/2018 | Eastwood | G06T 15/08 |
| 2019/0170507 A1* | 6/2019 | Grauzinis | G01B 11/2513 |
| 2019/0311546 A1* | 10/2019 | Tay | G06T 19/006 |
| 2020/0400769 A1* | 12/2020 | Arroyo Camejo | |
| | | | G01R 33/5608 |

FOREIGN PATENT DOCUMENTS

| | | |
|---|---|---|
| JP | 2004065995 A | 3/2004 |
| WO | WO 2018/153382 A1 | 8/2018 |

OTHER PUBLICATIONS

Yang.; "Precise and Automated Tomographic Reconstruction with a Limited Number of Projections." Karlsruhe Institute of Technology; 2016; 151 Pages.

* cited by examiner

MULTI-SCALE IMAGE RECONSTRUCTION OF THREE-DIMENSIONAL OBJECTS

RELATED APPLICATION(S)

This application is related to U.S. Provisional Application No. 62/731,652, filed Sep. 14, 2018, which is incorporated herein by reference.

BACKGROUND

Tomography is imaging by sections or sectioning, through the use of any kind of penetrating wave. Tomographic reconstruction may be a mathematical procedure used to reconstruct an image of an object. For example, x-ray computed tomography may produce an image from multiple projectional radiographs. Tomographic reconstruction is a type of multidimensional inverse problem involving the challenge of yielding an estimate of a specific object from a finite number of projections.

SUMMARY

One aspect of the present technology is to provide low latency tomographic reconstructions by way of multi-scale image decomposition of projection images and multi-scale image reconstruction of three-dimensional objects. In one aspect, low latency refers to a latency associated with transmitting projection image data to computing resources used for tomographic reconstruction. The present technology decreases this latency by decomposing at least a portion of a projection image to a reduced image set that is smaller in size than the projection image, and the reduced image set can be transmitted over a network to a remote data center (e.g., a "cloud") for processing. Decomposing the projection image to the reduced image set allows for faster transmission of projection image data over the network. Also, projection image data determined to be more relevant can be transmitted first through a communication bottleneck to allow the projection image data to be used to generate a tomographic reconstruction which can then be refined over time as less relevant data is received. In another aspect, low latency refers to a latency associated generating a tomographic reconstruction. The present technology can use computing resources of a remote data center for parallel processing of projection image data, which can reduce a latency associated with generating a tomographic reconstruction. In yet another aspect, low latency refers to a latency associated with displaying a tomographic reconstruction to a display device. In one case, the present technology reduces this latency using a multi-resolution multi-scale reconstruction process that first generates a reduced image reconstruction to display to a display device, and incrementally increase the quality of the image reconstruction by generating additional higher resolution, and/or depth image reconstructions to display to the display device.

Consequently, the present technology can provide low latency tomographic reconstruction by parallelizing a reconstruction method that uses a series of two-dimensional images to create a three-dimensional image, where the reconstruction process is divided into multiple reconstructions using multiple progressive inputs to generate the tomographic reconstruction, benefiting interventional imaging systems where fast tomographic reconstructions are needed. For example, when used with interventional systems, such as CT (Computerized Tomography) or CBCT (Cone Beam Computed Tomography), the present technology can reduce reconstruction latency allowing a 3D (Three-Dimension) imaging modality to be used as an image guidance system, providing faster 3D imaging during a procedure (e.g., 0.1 s and up). Many surgical solutions that suffer from latency issues can be improved (e.g., closed loop systems such as robotic systems, automatic injection of contrast agent, automatic injection of cement in kypho/vertebroplasty, or remote surgery and remote imaging in challenging environments such as rural areas, imaging in space or in underwater environments, etc.)

As a specific example, the present technology can be used to improve the performance of a tomographic system such as those described in U.S. Pat. No. 10,070,828, U.S. Application Publication No. US-2017-0200271-A1, and International Application Publication No. WO 2019/060843, which are incorporated by reference, (collectively "nView systems") by decreasing latency and enabling virtual fluoroscopy (i.e. computer generated fluoroscopic-like projections from a tomographic image). A challenge of providing standard fluoroscopy with a system such as nView's real-time cone beam tomosynthesis system is that x-rays are projected at an angle (i.e. not perpendicular to an x-ray detector), which can result in an image that can be disorienting to a user. One option that can be used to address the challenge is to generate a virtual projection from the tomographic reconstruction. However, in the past, extended latency (i.e. greater than 20-30 seconds and sometimes longer) associated with acquiring projection data, reconstructing a tomographic image and then generating a virtual projection to a user has made this option less preferred. The present technology can be used to reduce latency associated with acquiring projection data and reconstructing tomographic image to render a virtual projection using the reconstructed image for display to a user, making tomographic reconstruction a more desirable option for near real-time fluoroscopy. For example, reconstruction resolution, field of view, and/or image depth can be increased while providing faster tomographic reconstructions. The present technology can also be used with SaaS (Software as a Service) business models to provide low latency tomographic reconstructions and/or virtual fluoroscopy (e.g., a real-time imaging mode based on fast tomographic imaging where an image presented to a user includes computer generated projections through a volumetric reconstruction).

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

Figure 1:
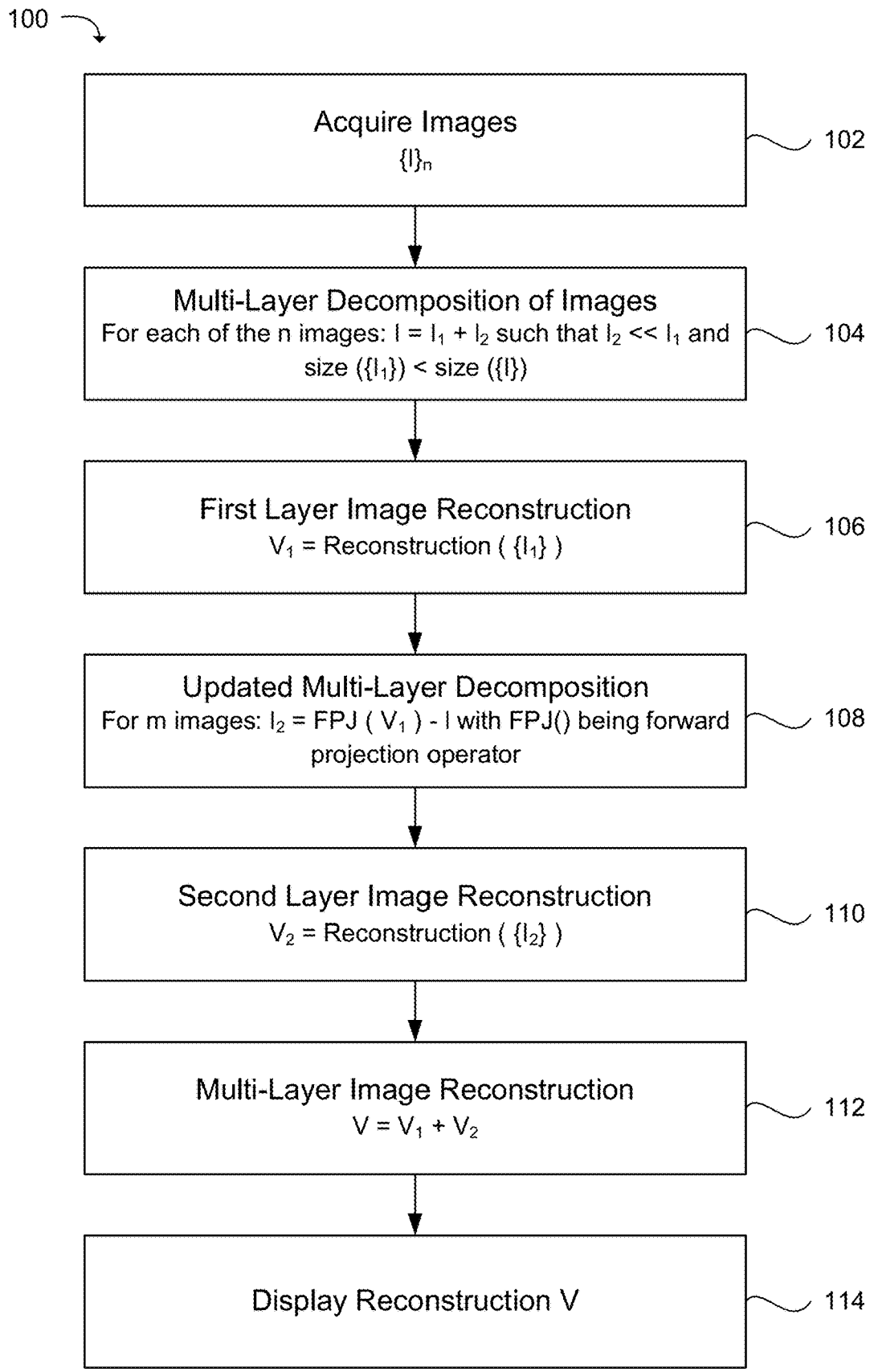
FIG. 1 is a flow diagram that illustrates an example method for tomographic reconstruction of a three-dimensional object using multi-scale decomposition and multi-scale reconstruction.

These drawings are provided to illustrate various aspects of the invention and are not intended to be limiting of the scope in terms of dimensions, materials, configurations, arrangements or proportions unless otherwise limited by the claims.

DETAILED DESCRIPTION

While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

Definitions

In describing and claiming the present invention, the following terminology will be used.

The singular forms "a," "an," and "the" include plural referents unless the context clearly dictates otherwise. Thus, for example, reference to "a constraint" includes reference to one or more of such values, and reference to "binning" refers to one or more such steps.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

As used herein, the term "at least one of" is intended to be synonymous with "one or more of." For example, "at least one of A, B, and C" explicitly includes only A, only B, only C, and combinations of each.

Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given herein.

Present Technology

Technologies are described for use in imaging systems to provide low latency tomographic reconstructions of three-dimensional objects. In one example, projection images can be captured using an imaging technique, including, but not limited to: medical imaging, computed tomography (CT), tomosynthesis (including real-time cone beam tomosynthesis), diagnostic imaging, interventional and surgical imaging, to enable virtual fluoroscopy (e.g., a near real-time imaging mode based on fast tomographic imaging where an image presented to a user comprises computer generated projections through a volumetric reconstruction), other x-ray based imaging, magnetic resonance imaging (MM), elastographic imaging, ultrasound, ultrasound transmission, and the like. Regardless, of an image dataset source, the projection images can be included in a projection image dataset to allow for generating reconstruction image data of a three-dimensional object using an iterative reconstruction technique.

As part of reducing latency associated with generating the reconstruction image data of the three-dimensional object, the projection image dataset can be decomposed to a reduced image dataset and a remainder image dataset. The reduced image dataset may have a lower quantity of data as compared to a quantity of data of the projection image dataset, and the remainder image dataset may indicate an image difference between the projection image dataset and the reduced image dataset. In one example, a data compression technique can be used to generate the reduced image dataset, and a difference between the reduced image dataset and the projection image dataset can be calculated to form the remainder image dataset. In other terms, the reduced image dataset can be viewed as a primary layer dataset, while the remainder image dataset can be viewed as a secondary layer dataset. As described in more detail later, the secondary layer dataset can be further decomposed into multiple additional layers.

After decomposing a projection image dataset into the reduced image dataset and the remainder image dataset, the datasets (i.e., the reduced image dataset and the remainder image dataset) can be transmitted to computing resources configured to reconstruct image data of the three-dimensional object using the datasets. Notably, the above projection image dataset can be an entire image dataset or a portion of an acquired image. Thus, the processes described herein can be applied to subsets of image data. For example, the decomposed projection image dataset can be an entire stack of 2D images (e.g. a full sinogram, a 3D dataset), a single 2D projection, a limited image segment (i.e. smaller segment of a larger image), or the like. A relevant subset of image data can be identified and the subset of image data can be included in a reduced image dataset to generate a relevant portion of a first scale image reconstruction (e.g., an anatomical structure) that is a higher quality representation than other portions of the first scale image reconstruction. Similarly, the reduced image dataset can be a reduced resolution image dataset, a reduced depth image dataset, a multi-resolution image, and/or a multi-depth image. As used herein, "resolution" may refer to a number of pixels or voxels in an image, and/or a depth (i.e., color scale or grayscale) of an image. A reduced multi-resolution image dataset can include portions of the image with a higher resolution, while other portions have a reduced resolution. As an example, a center portion of an image can be maintained with full uncompressed resolution, while outer portions of the image are reduced resolution. A similar approach can be applied to depth (i.e. color scale or grayscale) by allowing portions of the image dataset to be maintained at full depth, while other portions are reduced depth (e.g. 8 bit instead of 24, or 2 bit instead of 24, etc.). When polychromatic or multidimensional images are acquired, for example in multi energy x-ray data acquisition with photon counting detectors or dual energy exposures, the reduced dataset can be a monochromatic image (expressed in grey-levels) and the remainder can contain one or more color channels (for example to encode the multi-energy component of the image).

As one example, the datasets can be transmitted to a remote data center (e.g., a "cloud") that hosts computing resources configured to reconstruct the image data of the three-dimensional object using the datasets. As another example, computing resources included in a local imaging system (e.g., the imaging system used to capture the projection images) can be used to reconstruct the image data of the three-dimensional object using the datasets. By decomposing the projection image dataset to the reduced image dataset and the remainder image dataset, the size of the projection image dataset can be decreased to allow for a reduced latency associated with transmitting the reduced image dataset and the remainder image dataset to computing resources used to reconstruct the image data of the three-dimensional object.

Reconstruction image data for a three-dimensional object can be generated using an iterative reconstruction technique. In one example, the reconstruction technique can include generating a first scale image reconstruction of the three-dimensional object (e.g., a first volume of images representing the three-dimensional object) using the reduced image dataset, and generating a second scale image reconstruction of the three-dimensional object (e.g., a second volume of images representing the three-dimensional object) using the remainder image dataset. In some cases, the reconstruction technique can be an iterative reconstruction.

In one alternative, the remainder image dataset can be obtained from a lower resolution and/or lower depth description of the first scale image reconstruction of the three-dimensional object. The description of the reconstruction is obtained when the reconstruction is a low resolution, low depth, and then by projecting and comparing back to the initial images the remainder image dataset can be identified. Thus, the first dataset is not always reduced in size. For example, a first layer with low resolution projections images can be used to describe a low resolution reconstruction, and then the full resolution images are taken and compared to the projection of the lower resolution reconstruction, to create the remainder images, which then are reconstructed into a second scale reconstruction. One advantage of this alternative approach is that the simpler (and therefore in some cases faster) reconstruction method can be used since any modeling or mathematical error made in the first scale reconstruction can be recovered by the second scale reconstruction. One such simpler reconstruction method is filtered backprojection, which is faster but less accurate than other iterative methods.

As the first and second scale image reconstructions are generated, a multi-scale reconstruction of the three-dimensional object (e.g., a third volume of images representing the three-dimensional object) can be generated using the first scale image reconstruction and the second scale image reconstruction. In one example, a latency associated with displaying the three-dimensional object to a display device can be decreased by providing the first scale image reconstruction for display to a display device directly after the first scale image reconstruction has been generated. In doing so, a user can be provided with an image of the three-dimensional object prior to a higher quality image of the three-dimensional object being generated. Later, the second scale image reconstruction can be provided for display to the display device after being generated, thereby providing the user with a higher quality image of the three-dimensional object than that of the first scale image reconstruction. When the multi-scale reconstruction of the three-dimensional object becomes available, the multi-scale reconstruction can be provided for display to the display device, thereby providing a higher quality image of the three-dimensional object than that of the second scale image reconstruction. As used herein, "higher quality" may refer to higher image resolution and/or higher depth (color or gray scale). Latency can generally be less than about twenty seconds, and most often less than about five seconds depending on the image resolution, available computing resources, and image content. In some low resolution cases, latency can be less than one second. Regardless, the terms "real-time" and "near real-time" refer to less than 5 seconds in the context of the present invention. These same principles can also be applied to projections alone rather than a full three-dimensional image. In either scenario a first reduced image is reconstructed, and then the image remainder can be reconstructed independently of the first reduced image. Although typically the reconstructed images are displayed to a display device for human viewing, the reconstructed images could also be used as an input by a computer vision algorithm. For example, if the image is used by a robotic system, the computer vision algorithm can process the layers without recombination.

To further describe the present technology, examples are now provided with reference to the figures. FIG. 1 is a flow diagram that illustrates an example method 100 for tomographic reconstruction of a three-dimensional object using multi-scale decomposition and multi-scale reconstruction. As in block 102, projections images can be acquired from one or more imaging data detectors configured to detect x-ray radiation from one or more radiation sources. The projection images can be one-dimensional images (e.g., generated using a CT scanner) or two-dimensional images (e.g., generated using a CT scanner or CBCT scanner), where the projection images can include a complete set of available images or a subset of available images. In some examples, pre-processing of the projection images can be performed, such as denoising, rescaling, and the like, prior to acquiring the projection images for tomographic reconstruction of a three-dimensional object.

As in block 104, a multi-scale decomposition process can be used to generate reduced images (shown as "$I_1$" in block 104) and generate remainder images (shown as "$I_2$" in block 104). Note that block 104 step is optional. When omitted, the first layer image reconstruction 106 can be performed on the full image dataset, while the $I_2$ is generated via a forward projection of $V_1$ as shown in step 108. However, reduced resolution images can be generated to have lower resolutions as compared to resolutions of the projection images (shown as "I" in block 104) acquired from the one or more imaging data detectors. The reduced resolution images can be generated using various lossy data compression techniques. For simplicity we refer to reduced resolution to any lossy data compression of the original image, lowering resolution being the most common compression technique.

In one example, projection images can be reduced to a smaller size by coding each scale of the projection images with a smaller depth to produce lower depth images that have fewer bits as compared to the projection images. For example, a projection image that is 16 bits or a float value can be scaled to 8 bits to produce a reduced resolution image. As an example, combining image binning dividing the resolution by 2 on each image axis) and 8 bit coding can reduce the size of a 16 bit projection image to a reduced resolution image that is an eighth the size of the projection image. Illustratively, when a projection images is decomposed as an 8 bit depth reduced resolution image, 8 bit fixed point arithmetic can be advantageously used by a GPU (Graphic Processing Unit) to further accelerate reconstruction of a three-dimensional object using the reduced resolution image.

As another example, the projection images can be reduced by generating blurred versions of the projection images before image binning. In another example, a most significant byte technique (e.g., a bit tree) can be used to identify a portion of a projection image to include in a reduced image and the remaining portions of the projection image can be set aside for later use. In some examples, a combination of techniques described above can be used to generate reduced images. Illustratively, given the compressed nature of the reduced images (e.g., which could be half the size of the projection images due to depth, and a fourth of the size of the projection images by halving the resolution on each axis of the projection images, resulting in an eighth of the total size of the projection images) the reduced resolution images can be transmitted in a fraction of the time that would be needed to transmit the projection images. As will be appreciated, the present technology is not limited to the data compression techniques described above. The present technology can use any type of data compression to generate reduced images.

The remainder images generated in block 104 can be generated to indicate image resolution differences between the projection images acquired from the one or more imaging data detectors and the reduced images. In one example, the remainder images can be obtained by determining a resolution difference between the projection images and the reduced images. In another example, a first scale image reconstruction (described below) can be forward-projected (FPJ) to produce the remainder images. The size of the remainder images may be approximately less than the size of the full resolution images. In one example, to further reduce latency associated with transmitting and processing larger images, the remainder images can be further decomposed by compressing a first set of remainder images using a lossy compression technique to generate a second set of remainder images for use in reconstructing a three-dimensional object, and discarding the first set of remainder images. Lossy compression techniques can include, but are not limited to, JPEG, JPEG2000, H.264 and the like. Lossless compression can include, but is not limited to, ZIP, GZIP, sparse image encoding, and the like.

As in block 106, a first scale image reconstruction of the three-dimensional object (shown as "$V_1$" in block 106) can be generated using the reduced images. Due to the reduced resolution, reconstructing image data for a three-dimensional object may be performed in a shorter amount of time as compared to reconstructing the three-dimensional object using the higher resolution projection images. The first scale image reconstruction can be performed using an iterative forward/back projection process or a non-iterative reconstruction process such as a filtered backprojection. For example, an image volume X comprising the reduced images can be forward-projected (FPJ) to produce a set of two-dimensional (2D) projections. A difference between the reduced images and the forward projection of the image reconstruction can be backprojected (BPJ) into the 3D space to obtain an update volume $\varepsilon$. The iterative process can be repeated until an exit criterion is detected. In one example, the exit criterion can be a mathematical norm of the corresponding remainder image, or a metric derived from the corresponding remainder image can be used to define the exit criterion. In one example, the FPJ and BPJ operators can be matrix operations. For example, the FPJ and BPJ can be transposed matrices, which can be computed once, and then used at each iteration step. The matrices can be large to store in computer memory, therefore, the use of computing resources provided by a computing service provider and a fixed-point implementation may be advantageous.

The iterative forward/back projection process can be used to work on batches of images (e.g., reduced images), such as ordered subsets, to reconstruct an image of a three-dimensional object, which can decrease latency associated with waiting for a complete set of images to begin reconstruction of the image of the three-dimensional object. For example, if the reconstruction process uses a batch of one image (or a variable batch size, but starts with one image), a latency associated with starting the reconstruction is a time to transfer the first image from an image capture device (e.g., an imaging detector) to a computing resource used to reconstruct the image of the three-dimensional object. A similar subset approach can be taken on a "per image fraction" basis down to a "per ray basis" or "per pixel basis." In these examples, the subsets of data used to reconstruct the three-dimensional object can start as soon as a fraction of the image has been received, down to a single image pixel. Batching can be advantageously used to match specific memory and computing power. For example, at one extreme, each single ray or pixel can be treated with virtually no memory and no computer parallelization capability, and could be suitable for very simple and fast processors (for example quantum computers). At the other extreme, large batches can be better suited for a multi-GPU cloud environment with larges amounts of memory available and the ability to parallelize computation. In practice a scheme where the batches are variable and increase in size over time are advantageous as it minimizes latency due to data availability and transmission initially, while later minimizing computing latency, as more data is available and parallelization can be leveraged.

In one example, machine learning can be used to generate or modify the first scale image reconstruction of the three-dimensional object. For example, after obtaining an update volume c, a deep learning regularizer, such as a neural network (NN), can produce an updated solution. The deep learning regularizer can operate in a registered framework to enable the NN to add features and remove artifacts. In some examples, a density constraint can be applied when generating the first scale image reconstruction. A density constraint can include, but is not limited to, empty space, known objects and medical instruments, anatomical features, object borders, etc. In some examples, a regularizer can be used to introduce object features and density constraints into a first scale image reconstruction. For example, regularizers in tomographic reconstruction can be smoothness constraints (for example total variation) and density constraints (for example, positivity constraint). Also, blurring, denoising, or total variation can be used as regularizers. The second layer may require very different regularizers, typically symmetric and non-blurring characteristics. Each step of an iterative reconstruction process can improve the quality of the first scale image reconstruction, and the regularizer can be used to confine the solution space by incorporating prior knowledge about the three-dimensional object. For example, knowledge that projection images of a three-dimensional object being imaged contains only positive values, or that projection images of the three-dimensional object have a specified level of smoothness across uniform regions can be enforced using respectively, a positivity or smoothness constraint during the first scale image reconstruction.

In some examples, the first scale image reconstruction of the three-dimensional object can be displayed to a display device (e.g., a monitor, touchscreen, etc.) during reconstruction and/or after reconstruction of the three-dimensional object. For example, the first scale image reconstruction can be provided for display on the display device to allow a user to view the first scale image reconstruction of the three-dimensional object prior to reconstruction of a multi-scale reconstruction (e.g., a high resolution and/or depth reconstruction) of the three-dimensional object. Displaying the first scale image reconstruction reduces a latency associated with generating a higher quality reconstruction image the three-dimensional object and displaying the three-dimensional object to the display device as soon as images are available.

As in block 108, an updated multi-scale decomposition can be performed where the remainder images (shown as "$I_2$" in block 108) can be updated by applying a forward-projecting (FPJ) operator to the first scale image reconstruction (shown as "$V_1$" in block 108) and determining a resolution/depth difference between the result and the projection images (shown as "I" in block 108). In one example, with reference to blocks 104 and 108, m $I_2$ images can be the n images at an angle that is the same as an angle of the n $I_1$ images, or a different number of images at any angle. If the angles do not match, sampling between the n images or available images I can be performed.

As in block 110, a second scale image reconstruction of the three-dimensional object (shown as "$V_2$" in block 110) can be generated using the remainder images (shown as "$I_2$" in block 110). The second scale image reconstruction can be the same or higher resolution/depth as the first scale image reconstruction. The second scale image reconstruction can be performed using the iterative forward/back projection process described earlier in association with block 106. In one example, the second scale image reconstruction can be of a higher quality than that of the first scale image reconstruction by having a smaller region of interest. For example, the second scale image reconstruction can be a higher resolution and/or depth image of a region of interest within an area contained in the first scale image reconstruction. As one example, one or more regions of interest contained within the first scale image reconstruction can be identified and the second scale image reconstruction can be generated to provide a higher resolution and/or depth image of the one or more regions of interest. The region of interest, in one example, can be chosen dynamically (e.g., based on a view of the first scale image reconstruction selected by a user, or based on a recognized feature of a three-dimensional object), or the region of interest can be manually selected (e.g., by manually selecting, via a touchscreen device, an area of the first scale image reconstruction of the three-dimensional object displayed to the touchscreen device).

In another example, the second scale image reconstruction can be the same resolution and/or depth as the first scale image reconstruction, and the second scale image reconstruction can be shifted in position in order to create an interleaved volume with the first scale image reconstruction. This avoids coding and processing zero values at overlapping nodes of the image. In some instances, the second scale image reconstruction of the three-dimensional object can be generated based on a grid that is selected to not include any node that is common with the first scale image reconstruction in order to improve computational efficiency associated with generating the second scale image reconstruction. For example, interleaved grids with half voxel offsets having the same resolution can be used to generate the second scale image reconstruction. In some examples, after the second scale image reconstruction of the three-dimensional object has been generated, the second scale image reconstruction can be directly provided for display on a display device to allow a user to view the second scale image reconstruction of the three-dimensional object prior to reconstruction of a multi-scale reconstruction of the three-dimensional object.

As in block 112, a multi-scale image reconstruction of the three-dimensional object (shown as "V" in block 112) can be generated using the first scale image reconstruction (shown as "$V_1$" in block 112) and the second scale image reconstruction (shown as "$V_2$" in block 112). Multiple layers (e.g., resolutions, regions of interest, and/or image depths included in the first and second scale image reconstructions) can be sequentially obtained for inclusion in the multi-scale image reconstruction and the layers can be combined to generate the multi-scale image reconstruction of the three-dimensional object. In some examples, the multi-scale image reconstruction can account for a region of interest, which in some cases, may involve resampling using GPU textures. The multi-scale image reconstruction of the three-dimensional object can be of a higher quality than the first and second scale image reconstructions. For example, the multi-scale reconstruction can be of a higher image resolution and/or a higher depth than that of the first and second scale image reconstructions.

Figure 9A:
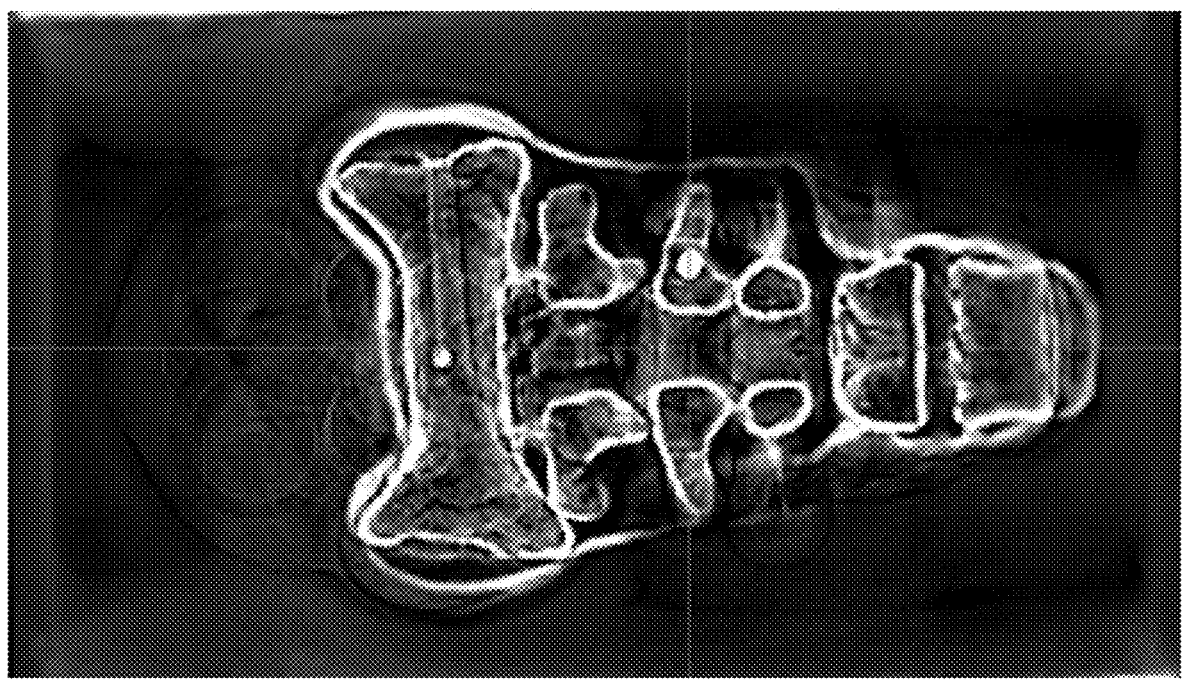
FIG. 9A is a high resolution final reconstruction of a spine model using an example method of reconstruction consistent with this disclosure.
Figure 9B:
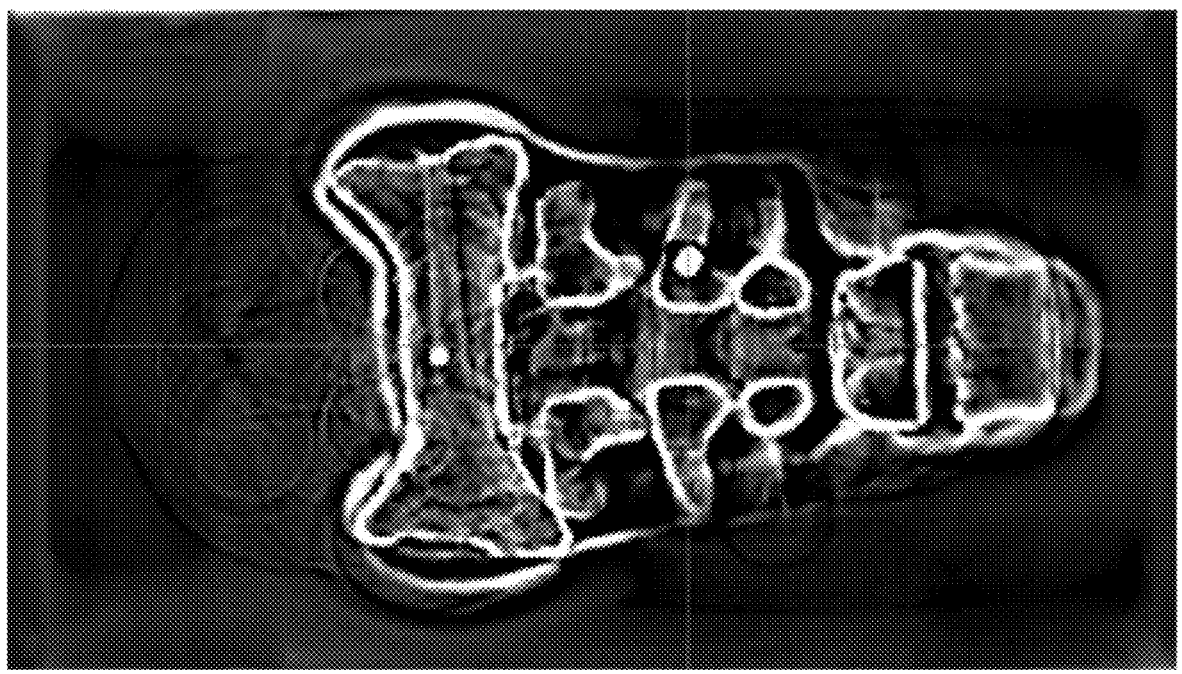
FIG. 9B is a first scale reconstruction of the spine model in FIG. 9A.
Figure 9C:
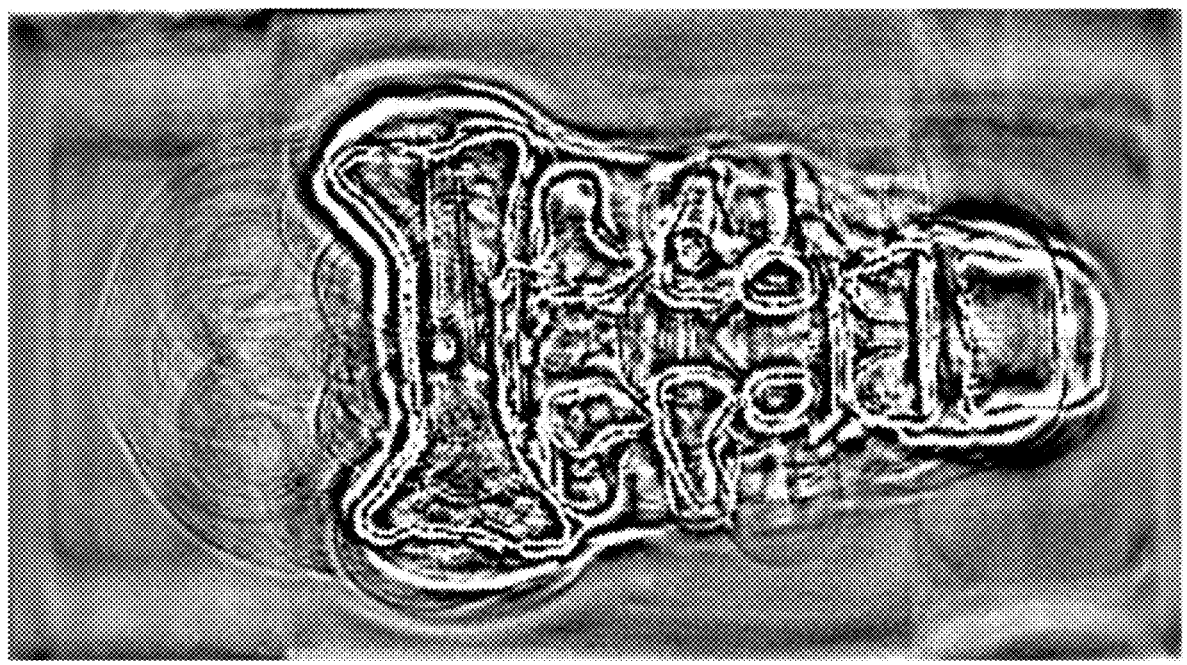
FIG. 9C is a second scale final reconstruction of the spine model of FIG. 9A.

As in block 114, the multi-scale image reconstruction of the three-dimensional object (shown as "V" in block 114) can be displayed to a display device. Visualization of the three-dimensional object can include slicing of volumetric data, three-dimensional rendering, projections, and the like. Visualization can also include post-processing. Such processing can include denoising, interpolation, resampling, non-linear operations such as gamma correction and dimension expansion via color-mapping to name a few. Display of an image reconstruction (e.g., a first scale image reconstruction, a second scale image reconstruction, or a multi-scale image reconstruction) can be provided to a local display, or provided to a remote display, and in the case where processing is performed in a remote data center, the image can be rendered at the remote data center and the render of the image can be provided for display to a local display device. Such remote to local display transmission can be achieved for example via video compression such as H.264. Compression techniques such as JPEG2000 decompose the image in layers. Matching the multi-scale reconstruction layers with the compression technique inputs may be advantageous by reducing encoding time, and thus reducing latency. Similarly, when the image is paired to a computer vision algorithm as a consumer of the image (for example for robotic surgery), matching the multi-scale reconstruction layers with the computer vision algorithm inputs may be advantageous (for example the remainder layer typically has differential content that can be directly exploited by algorithm to identify the edges of the anatomy as illustrated in FIGS. 9A, 9B and 9C. FIG. 9A is a high resolution final reconstruction of a spine model. FIG. 9B is a first scale reconstruction of the spine model. Note that FIG. 9B is blurred compared to FIG. 9A. FIG. 9C is a second scale final reconstruction.

Figure 2:
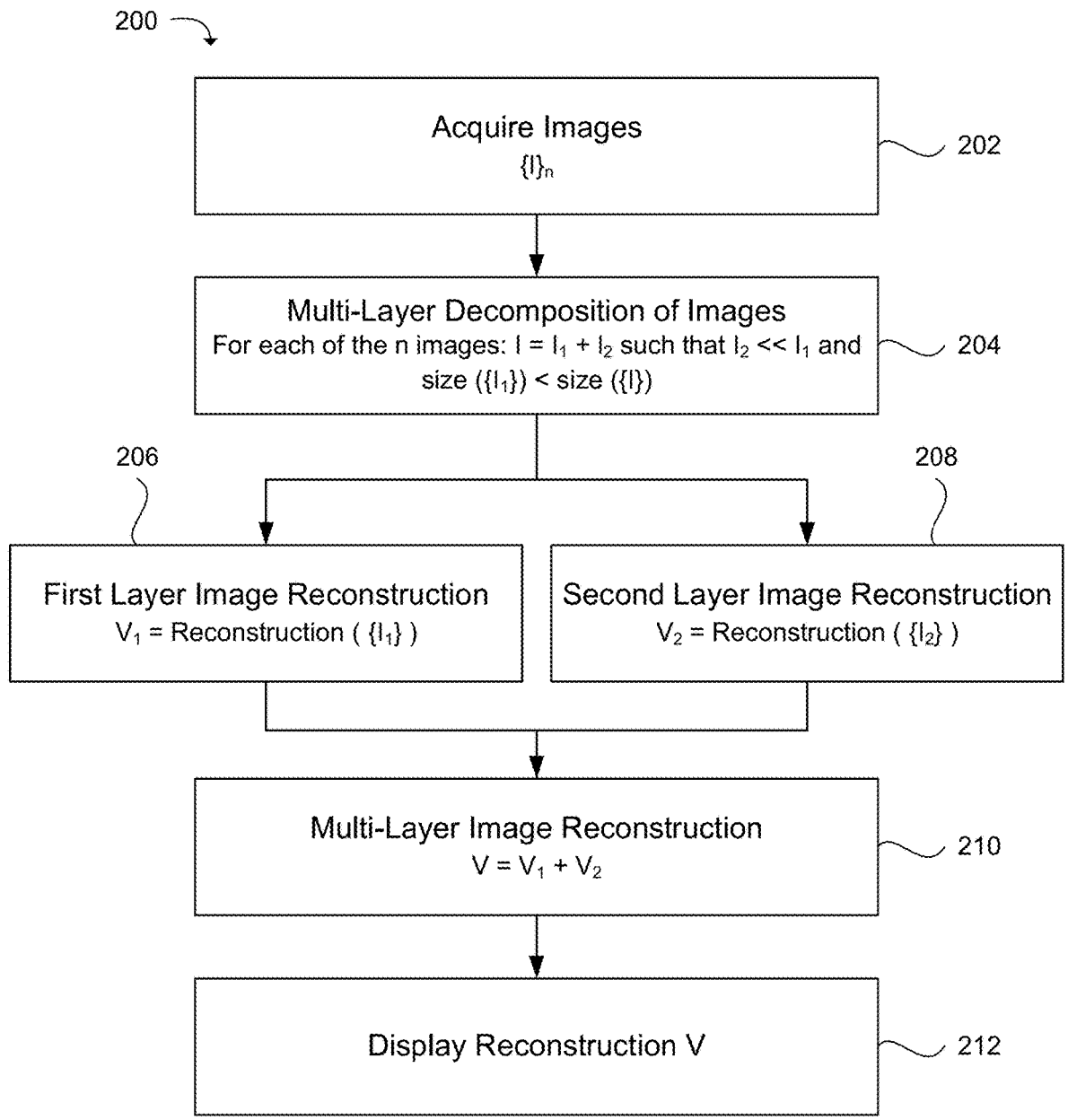
FIG. 2 is a flow diagram illustrating an example method for tomographic reconstruction of a three-dimensional object using multi-scale decomposition and multi-scale reconstruction using parallel processing.

FIG. 2 is a flow diagram that illustrates an example method 200 for tomographic reconstruction of a three-dimensional object using multi-scale decomposition and multi-scale reconstruction using parallel processing. As in block 202, a projection image dataset that includes a plurality of projection images can be acquired to allow for generating reconstruction image data of a three-dimensional object using an iterative reconstruction technique. The projection images may comprise projection data generated by an imaging detector in response to detecting x-ray radiation from a radiation source. As described in detail in association with FIG. 1, a multi-scale decomposition of the projection image dataset can be performed to generate reduced images for each of the plurality of projection images included in the projection image dataset, as in block 204, and generate remainder images for the reduced images that indicate image differences between the plurality of projection images and the reduced images.

After decomposing at least a portion of the projection image dataset into the reduced images and the remainder image dataset, a first scale image reconstruction and a second scale image reconstruction can be performed, as in blocks 206 and 208. The first and second scale image reconstructions of the three-dimensional object can be performed in parallel. In one example, a remote data center ("cloud") that includes computing resources for generating the first and second scale image reconstructions in parallel can be used. The computing resources can leverage GPU clusters, or a multi-GPU environment, which can be used to generate the first and second scale image reconstructions. Illustratively, local computing resources can be used to decompose the projection image dataset into the reduced images and the remainder images, and thereafter, the reduced images and the remainder images can be transmitted to the remote data center for parallel reconstruction of the first and second scale images. In one example, a local computer can reconstruct a first layer while the second layer can be treated in the cloud. In yet another example, computing resources can be used to generate, in parallel, the first and second scale image reconstructions. One disadvantage associated with generating the first and second scale image reconstructions in parallel may be that a reconstruction imperfection of the first scale image reconstruction may not be resolved due to not performing an updated multi-scale decomposition (as described in block 108 of FIG. 1), where an imperfection can be resolved when generating the second scale image reconstruction (as shown in block 110 of FIG. 1). In order to compensate for this disadvantage, additional reconstruction iterations can be performed following a multi-scale image reconstruction to resolve an eventual discrepancy that may occur. Conversely, one advantage of such approach is that there is limited requirement to synchronize the data between the different computing units, making computation more efficient. For example if the same scale reconstruction is split into different computing units, the reconstruction solution that is iteratively changing has to be distributed across the different computing units and for example merged via averaging with the solution of the other computing units.

As in block 210, a multi-scale image reconstruction of the three-dimensional object can be generated using the first scale image reconstruction and the second scale image reconstruction, as described earlier. In the example where the first and second scale image reconstructions are generated in a remote data center, the first and second scale image reconstructions can be transmitted back to a local computing resource used to generate the multi-scale image reconstruction of the three-dimensional object, and the multi-scale image reconstruction can be provided for display on a display device, as in block 212. Alternatively, the multi-scale image reconstruction of the three-dimensional object can be generated at the remote data center, and the multi-scale image reconstruction can be either be transmitted to a local computing resource for display to a display device, as in block 212, or the multi-scale image reconstruction can be rendered at the remote data center and the render of the three-dimensional object can be provided for display to a local display device.

Figure 3:
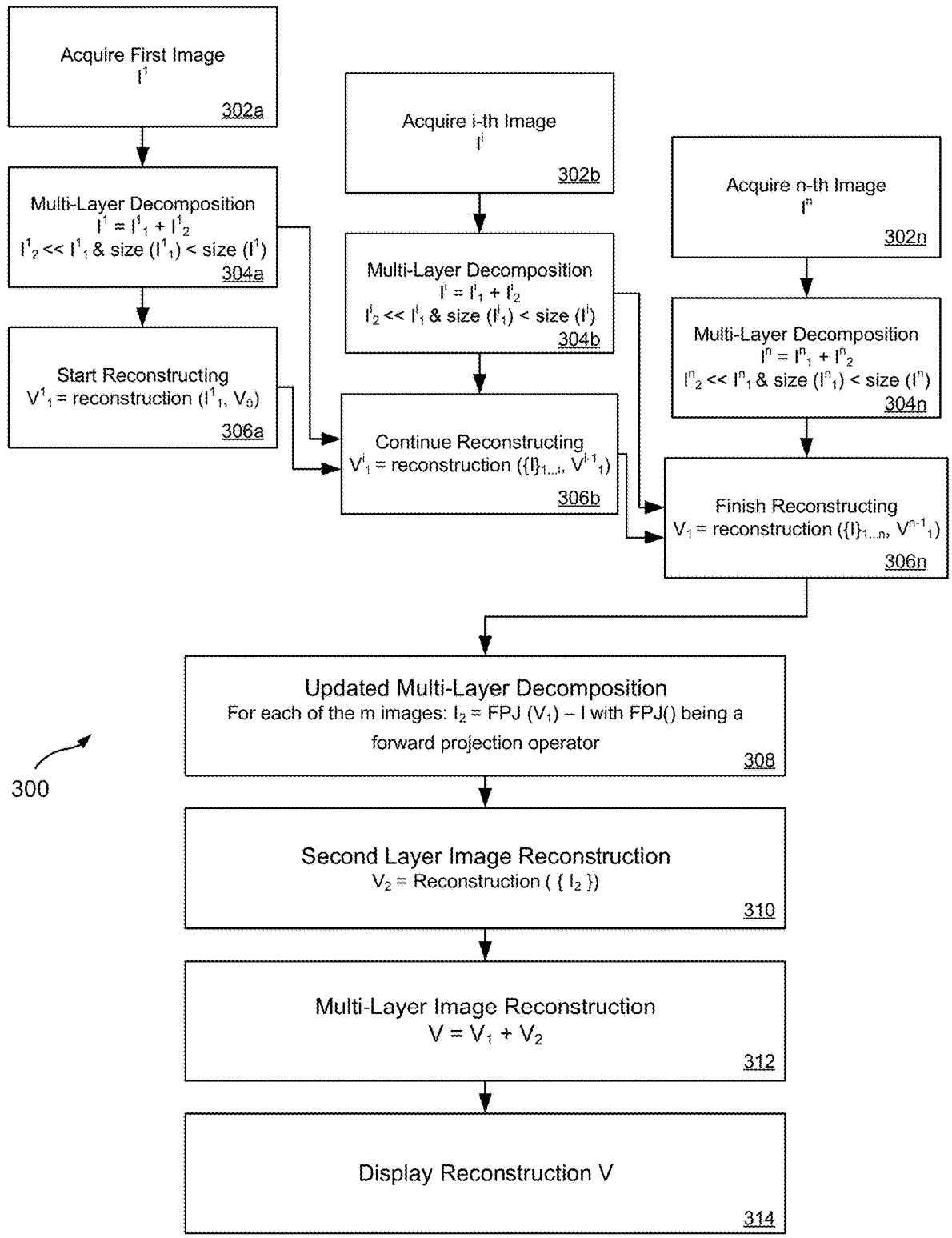
FIG. 3 is a flow diagram that illustrates an example method for tomographic reconstruction using batch data to perform multi-scale decomposition and multi-scale reconstruction of a three-dimensional object.

FIG. 3 is a flow diagram that illustrates an example method 300 for tomographic reconstruction using batch data to perform multi-scale decomposition and multi-scale reconstruction of a three-dimensional object. The method 300 can include acquiring projection images of the three-dimensional object in batches to allow for processing to begin when a first projection image is available for processing and to enable parallel processing of projection images, thereby reducing latency due to an acquisition system being slow at providing projection images.

As in block 302a, a first projection image can be acquired whereupon after acquiring the first projection image, as in block 304a, a multi-scale decomposition process can be used to generate a reduced image and a remainder image from the projection image. As in block 306a, a first scale reconstruction of the three-dimensional object can be started using the reduced image.

While the first scale reconstruction shown in block 306a is being performed, additional projection images may become available, which as in block 302b, can be acquired. As in block 304b, the multi-scale decomposition process can be performed on the additional projection images, and as in block 306b, the first scale reconstruction of the three-dimensional object can continue using the reduced images generated from the additional projection images. As in block 302n, a last projection image can be acquired and, as in block 304n, the multi-scale decomposition process can be performed on the last projection image. Thereafter, as in block 306n, the first scale reconstruction of the three-dimensional object can be completed using the reduced image generated from the last projection image. Examples of reconstruction methods that can be used for the first scale reconstruction of the three-dimensional object include, but are not limited to, ordered subsets reconstruction methods, stochastic gradient descent methods, Nesterov methods or other momentum based methods, and other methods that can leverage batched image data using a subset of image data at each optimization step.

As illustrated in block 302b, a second input (shown as "I'") may be a volume of projection images, which may be equivalent to evolving the solution based on changing data vs. porting over a previous solution as an initial best guess of the next step. Also, "$V_0$" shown in block 306a can be a volume of zeros, or the most likely solution, a volume of expected density of imaged material, or a registered volume, like for example, the expected image derived from a database of scans or a machine learning process.

After the first scale image reconstruction of the three-dimensional object has generated, an updated multi-scale decomposition can be performed, as in block 308, where remainder images generated from the projection images, as in blocks 304a-n, can be updated by applying a forward-projecting (FPJ) operator to the first scale image reconstruction and determining a resolution/depth difference between the result and the projection images. Thereafter, a second scale image reconstruction can be generated using the updated remainder images, as in block 310, and a multi-scale image reconstruction of the three-dimensional object can be generated using the first and second scale reconstructions, as in block 312. Finally, as in block 314, the multi-scale image reconstruction of the three-dimensional object can be displayed to a display device.

Figure 4:
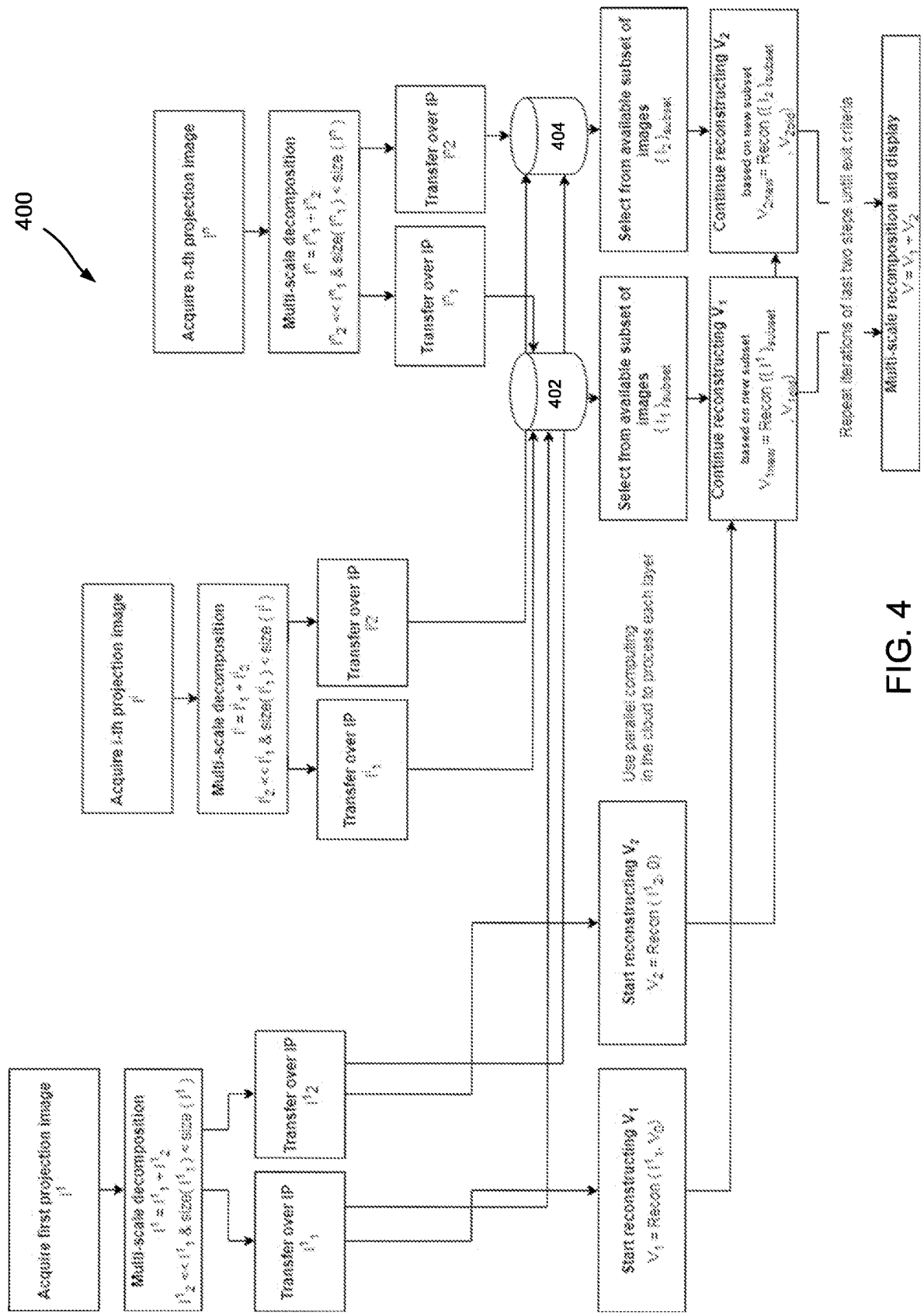
FIG. 4 is a flow diagram illustrating an example method for multi-scale reconstruction of a three-dimensional object using parallel computing in a remote data center to process layers of the multi-scale reconstruction.

FIG. 4 is a flow diagram illustrating an example method 400 for multi-scale reconstruction of a three-dimensional object using parallel computing in a remote data center to process layers of the multi-scale reconstruction. As illustrated, projection images of the three-dimensional object can be acquired in batches. After receiving a projection image, the multi-scale decomposition process described earlier can be performed locally to decrease a time needed to transfer the resulting reduced image and remainder image to computing resources located in a remote data center. The computing resources can be configured to start first and second scale reconstructions of the three-dimensional object using the reduced image and remainder image.

As additional projection images are acquired, reduced images and remainder images can be generated from the projection images and the reduced images and remainder images can be transmitted to the remote data center to allow the first and second scale reconstructions of the three-dimensional object to be generated using the reduced images and the remainder images.

As illustrated in FIG. 4, reduced images can be stored to data store 402, and remainder images can be stored to data store 404. As part of generating the first scale image reconstruction of the three-dimensional object, a subset of available reduced images can be selected from the data store 402 and the subset of reduced images can be used to generate the first scale reconstruction. A subset of available remainder images can be selected from the data store 404 and the subset of remainder images can be used to generate the second scale reconstruction of the three-dimensional object. The iterative reconstruction technique described in relation to FIG. 1 can be used to generate the first and second scale image reconstructions, and exit criteria (e.g., a mathematical norm of a reduced image/remainder image or a metric derived from the reduced image/remainder image) can be used to determine when to exit the iterative reconstruction process. The resulting first and second scale reconstructions can then be used to generate a multi-scale image recomposition, which can be displayed to a display device as previously described.

Figure 5:
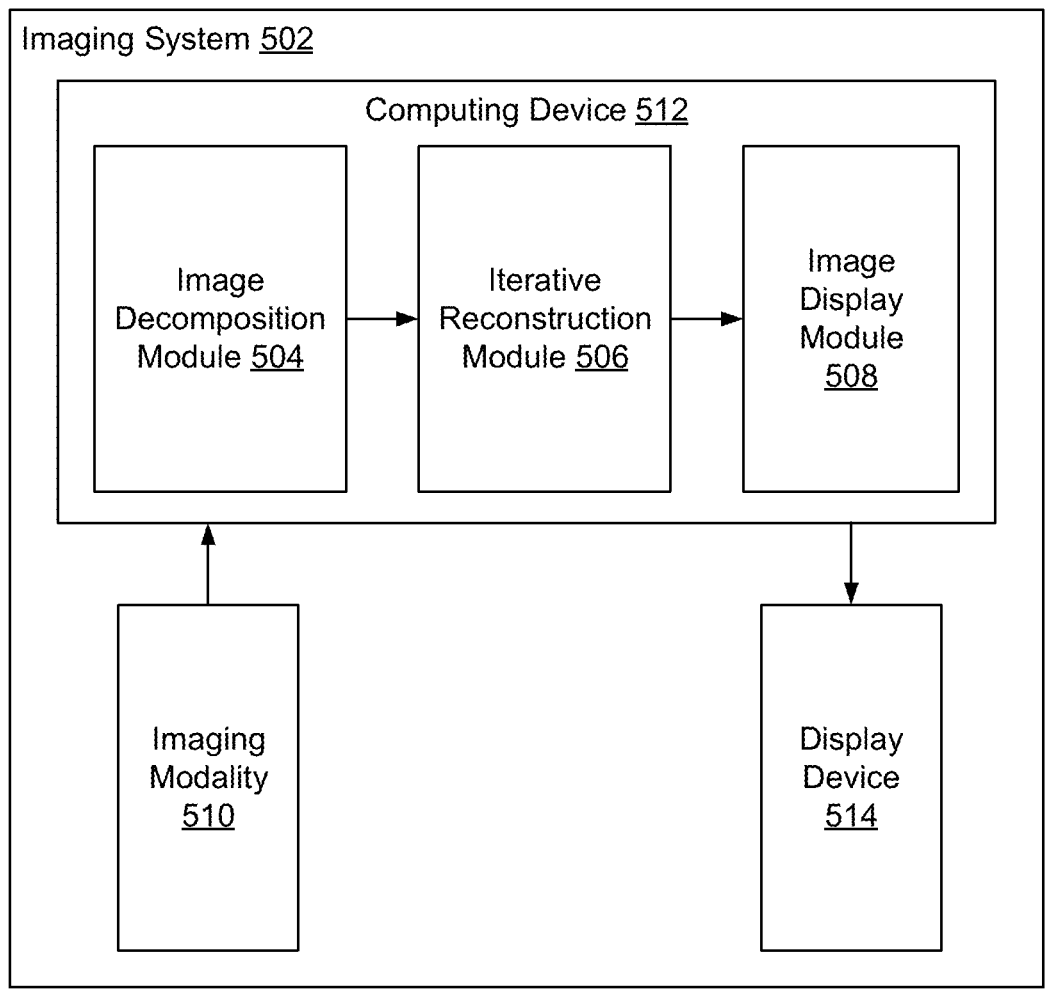
FIG. 5 is a block diagram that illustrates an example imaging system configured to reconstruct a multi-scale image a three-dimensional object using an iterative reconstruction technique.

FIG. 5 is a block diagram that illustrates an example imaging system 502 configured to reconstruct a multi-scale image a three-dimensional object using an iterative reconstruction technique. As illustrated, the imaging system 502 can include an imaging modality 510 configured to generate a projection image dataset for a three-dimensional object, a computing device 512 used to host various modules associated with generating and displaying image reconstructions of a three-dimensional object, and a display device 514 used to display the image reconstructions of the three-dimensional object.

The components of the imaging system 502 can be contained in a workstation, or the components of the imaging system 502 can be located separately and can be configured to communicate with one another over a network (e.g., local area network (LAN), wide area network (WLAN), short range network protocol, or cellular network such as 4G or 5G, etc.). Illustratively, the imaging system 502 can be a CT-Scanner or CBCT imaging system. The imaging modality 510 can be any imaging device that incorporates, for example, imaging technologies of computed tomography, radiography, fluoroscopy, and x-ray tomosynthesis, although other technologies such as elastography, tactile imaging, thermography, and/or medical photography and nuclear medicine functional imaging techniques as positron emission tomography (PET) and single-photon emission computed tomography (SPECT) could also be used. In one example, the imaging modality 510 can be a computed tomography (CT) scanner or a tomosynthesis system. As will be appreciated, imaging modalities that are not specifically described herein are also within the scope of this disclosure. For example, imaging systems such as those described in U.S. Pat. No. 10,070,828 and U.S. Application Publication No. 2017-0200271-A1 and PCT Application Publication No. WO 2019/060843 (all of which are incorporated herein by reference) are particularly effective systems for image reconstruction.

The computing device 512 can comprise a processor-based system and can include any such device capable of receiving projection image data from an imaging modality 510 and outputting reconstructed projection image data to the image display module 508, as well as hosting the image decomposition module and the iterative reconstruction module 506. The image decomposition module 504, when executed on the computing device 512, decomposes a projection image dataset into sets of image datasets that have lower quantity of data as compared to the projection image dataset. In particular, the image decomposition module 504 generates a reduced image dataset and an image remainder dataset. The image decomposition module 504 can be configured to apply a lossy data compression technique to a projection image dataset to generate a reduced image dataset which has a lower quantity of data as compared to a resolution of the projection image dataset. Also, the image decomposition module 504 can be configured to generate an image remainder dataset by calculating an image resolution difference between the projection image dataset and the reduced image dataset. Reduced image datasets and image remainder datasets generated by the image decomposition module 504 can be provided to the iterative reconstruction module 506.

The iterative reconstruction module 506, when executed on the computing device 512, reconstructs an image of a three-dimensional object using an iterative reconstruction technique applied to a reduced image dataset and image remainder dataset received from the image decomposition module 504. The iterative reconstruction module 506 generates a first scale image reconstruction of the three-dimensional object using the reduced image dataset, and generates a second scale image reconstruction of the three-dimensional object using the image remainder dataset. As the first and second scale image reconstructions are generated, the iterative reconstruction module 506 generates a multi-scale image reconstruction of the three-dimensional object using the first scale image reconstruction and the second scale image reconstruction.

As indicated above, the iterative reconstruction module 506 generates the image reconstructions (i.e., a first, second, and multi-scale image reconstructions) using an iterative reconstruction technique. In one example, the iterative reconstruction technique includes the steps of (i) forward projecting a ground truth image volume to produce a two-dimensional set of projection images, (ii) determining a difference between the projection image dataset and the two-dimensional set of projection images, (iii) generating an update volume by back projecting the difference into a three-dimensional space, and (iv) incorporating the update volume into a reconstruction of the image of the three-dimensional object. In one example, a regularizer can be used to introduce object features and constraints (e.g., densities, borders, curves, etc.) into the image of the three-dimensional object being reconstructed. In at least one example, a machine learning model can be used as a regularizer. For example, after one or more iterations of the reconstruction process, output of the machine learning model can be provided as input to a next iteration of the reconstruction process. In some examples, a plurality of machine learning models can be used as regularizers at different stages of the iterative reconstruction technique.

Figure 6:
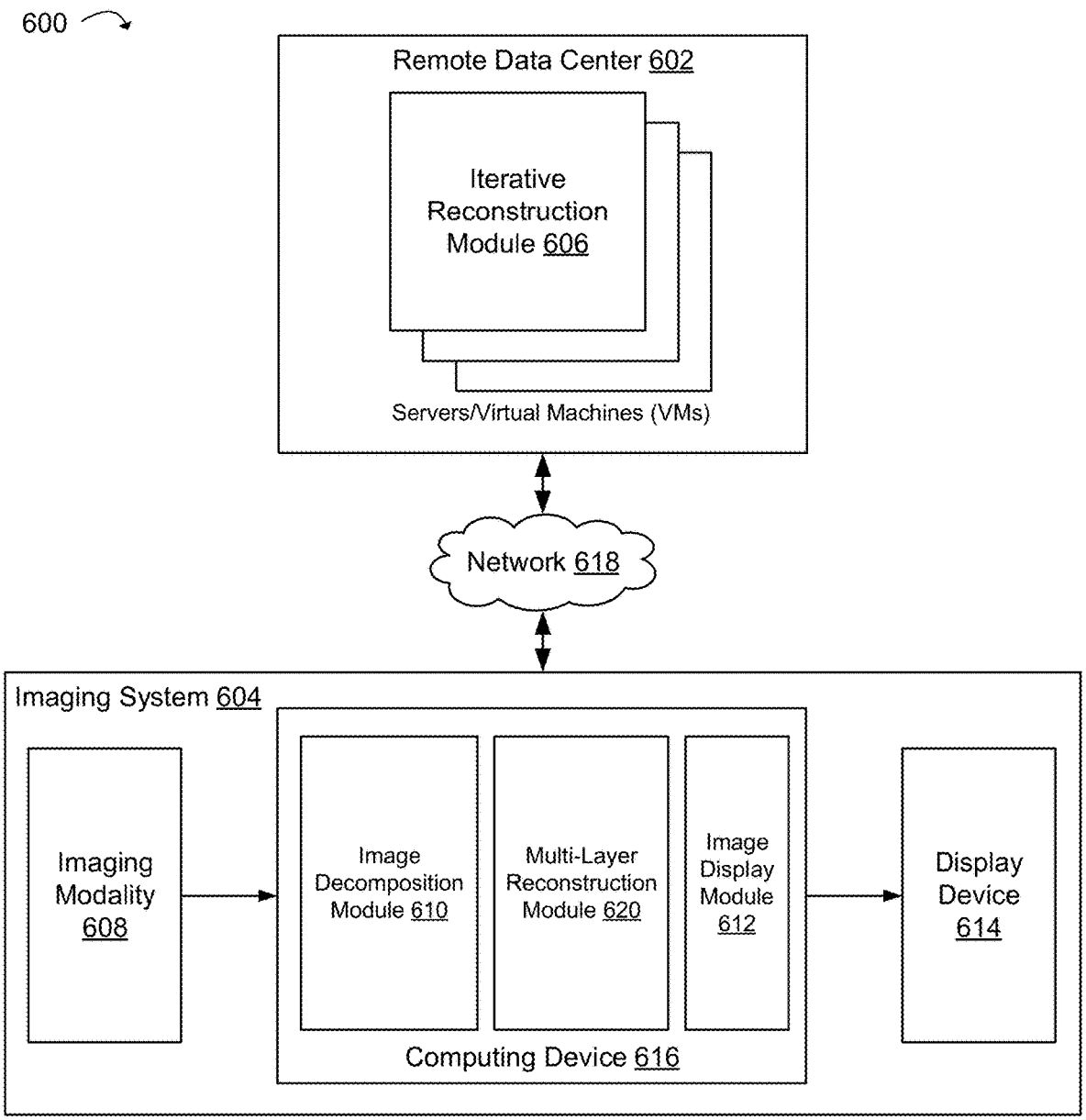
FIG. 6 is a block diagram that illustrates an example system which includes an imaging system which is in network communication with computing resources in a remote data center.

Image reconstructions (i.e., a first, second, and multi-scale image reconstructions) generated by the iterative reconstruction module 506 can be provided to the image display module 508 configured to output the image reconstructions to a display device 514, including a monitor, mobile device, or other type of display for presentation of the reconstructed image to a user, such as a medical professional. In one example, image reconstructions can be provided to the image display module 508 directly after being generated to reduce a latency associated with generating higher quality image reconstructions. As an example, the iterative reconstruction module 506 can provide a first scale image reconstruction to the image display module 508 for display on the display device 514 as soon as the first scale image reconstruction is ready. Subsequently, the iterative reconstruction module 506 can provide a second scale image reconstruction, and thereafter, a multi-scale image reconstruction, to the image display module 508 for display on the display device 514 in order to increase resolution, field of view, and/or image depth of an image reconstruction of a three-dimensional object. Visualization of the three-dimensional object provided by the image display module 508 can include slicing of volumetric data, three-dimensional rendering, projections, and the like FIG. 6 is a block diagram that illustrates an example system 600 which includes an imaging system 604 as described in relation to FIG. 5 which is in network communication with computing resources in a remote data center 602 (e.g., a "cloud" computing environment). In this example, the imaging system 604 can include an imaging modality 608 configured to generate a projection image dataset for a three-dimensional object, a computing device 616 used to host various modules associated with generating and displaying image reconstructions of a three-dimensional object, and a display device 614 used to display the image reconstructions of the three-dimensional object.

The computing device 616 can host an image decomposition module 610, a multi-scale reconstruction module 620, and an image display module 612. The image decomposition module 610, when executed on the computing device 616, decomposes a projection image dataset received from the imaging modality 608 into a reduced image dataset and an image remainder dataset and sends the datasets to the remote data center 602 for parallel processing using instances of an iterative reconstruction module 606 to generate first and second scale image reconstructions as described earlier.

The multi-scale reconstruction module 620 receives the first and second scale image reconstructions sent from the remote data center 602 and provides the first and second scale image reconstructions to the multi-scale reconstruction module 620. Thereafter, the multi-scale reconstruction module 620, when executed on the computing device 616, generates a multi-scale image reconstruction of the three-dimensional object using the first scale image reconstruction and the second scale image reconstruction and the iterative reconstruction technique described above in relation to FIG. 5, and provides the multi-scale image reconstruction of the three-dimensional object to the image display module 612 for display to the display device 614.

The remote data center can include computing resources for hosting instances of the iterative reconstruction module 606. The computing resources can include servers and/or virtual machines executed on servers. Image data for reconstructing a three-dimensional object can be sent between the remote data center 602 and the imaging system 604 over a network 618. The network 618 may include any useful computing network, including an intranet, the Internet, a local area network, a wide area network, a wireless data network, or any other such network or combination thereof. Components utilized for such a network 618 may depend at least in part upon the type of network and/or environment selected. Communication over the network may be enabled by wired or wireless connections and combinations thereof.

The reconstruction module 606 hosted on the remote data center 602, when executed, may reconstruct an image of a three-dimensional object using a reconstruction technique applied to a reduced image dataset and image remainder dataset received from the image decomposition module 610. The reconstruction module 606 generates a first scale image reconstruction of the three-dimensional object using the reduced image dataset, and generates a second scale image reconstruction of the three-dimensional object using the image remainder dataset. Generation of reconstruction images can be performed in parallel using multiple instances of the reconstruction module 606. After generating a reconstruction image (e.g., a first or second scale image reconstruction), the iterative reconstruction module 606 sends the first and second scale image reconstructions to the multi-scale reconstruction module 620 located in the imaging system 604 to allow the multi-scale reconstruction module 620 to generate a multi-scale image reconstruction of the three-dimensional object for display on the display device 614.

Figure 7:
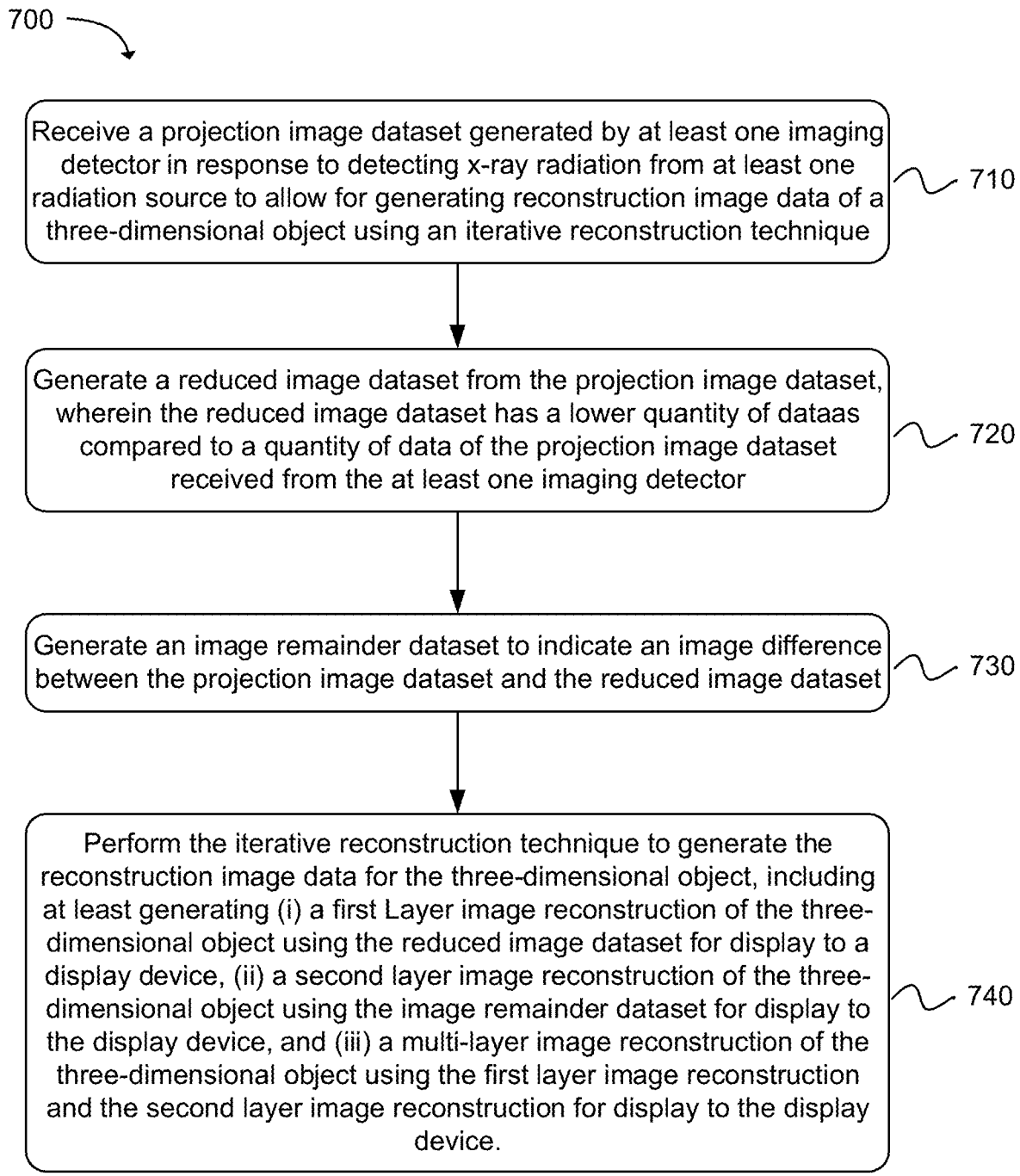
FIG. 7 is a flow diagram illustrating an example method for reconstruction of a three-dimensional object using multi-scale decomposition and multi-scale reconstruction.

FIG. 7 is a flow diagram illustrating an example method 700 for reconstruction of a three-dimensional object using multi-scale decomposition and multi-scale reconstruction. As in block 710, a projection image dataset may be received, wherein the projection image data set may be generated by at least one imaging detector in response to detecting x-ray radiation from at least one radiation source to allow for generating reconstruction image data of a three-dimensional object using an iterative reconstruction technique.

In one example, the reduced image dataset is generated using a lossy data compression technique. In some examples, a projection image dataset can include an ordered subset of projection image data to allow reconstruction of a three-dimensional object to start prior to receiving a complete set of projection images.

As in block 720, a reduced image dataset may be generated from the projection image dataset, wherein the reduced image dataset has a lower quantity of data as compared to a quantity of data of the projection image dataset received from the at least one imaging data detector. As in block 730, an image remainder dataset may be generated to indicate an image resolution difference between the projection image dataset and the reduced image dataset.

As in block 740, the reconstruction technique may be performed to generate the reconstruction image data for the three-dimensional object, including at least generating (i) a first scale image reconstruction of the three-dimensional object using the reduced image dataset for display to a display device, (ii) a second scale image reconstruction of the three-dimensional object using the image remainder dataset for display to the display device, and (iii) a multi-scale image reconstruction of the three-dimensional object using the first scale image reconstruction and the second scale image reconstruction for display to the display device.

In one example, the iterative reconstruction technique includes: (i) forward projecting a ground truth image volume to produce a two-dimensional set of projection images, (ii) determining a difference between the projection image dataset and the two-dimensional set of projection images, (iii) generating an update volume by back projecting the difference into a three-dimensional space, and (iv) incorporating the update volume into a reconstruction of the image of the three-dimensional object.

In one example, a first scale image reconstruction of a three-dimensional object can be displayed to a display device directly after generating the first scale image reconstruction, and a second scale image reconstruction of the three-dimensional object can be displayed to the display device directly after generating the second scale image reconstruction.

In one example, the first scale image reconstruction and the second scale image reconstruction can be generated in parallel. In some examples, generating the first scale image reconstruction and the second scale image reconstruction of the three-dimensional object includes applying a constraint (e.g., borders, curves, empty space, known objects and medical instruments, anatomical features, etc.) to the reconstruction.

In one example, generating the second scale image reconstruction includes increasing a resolution of a region of interest within the second scale image reconstruction of the three-dimensional object. In some examples, the second scale image reconstruction of the three-dimensional object can be a higher resolution as compared to a resolution of the first scale image reconstruction. In other examples, the second scale image reconstruction of the three-dimensional object can be a same resolution as the first scale image reconstruction and the second scale image reconstruction can be shifted in position to create an interleaved volume with the first scale image reconstruction.

Figure 8:
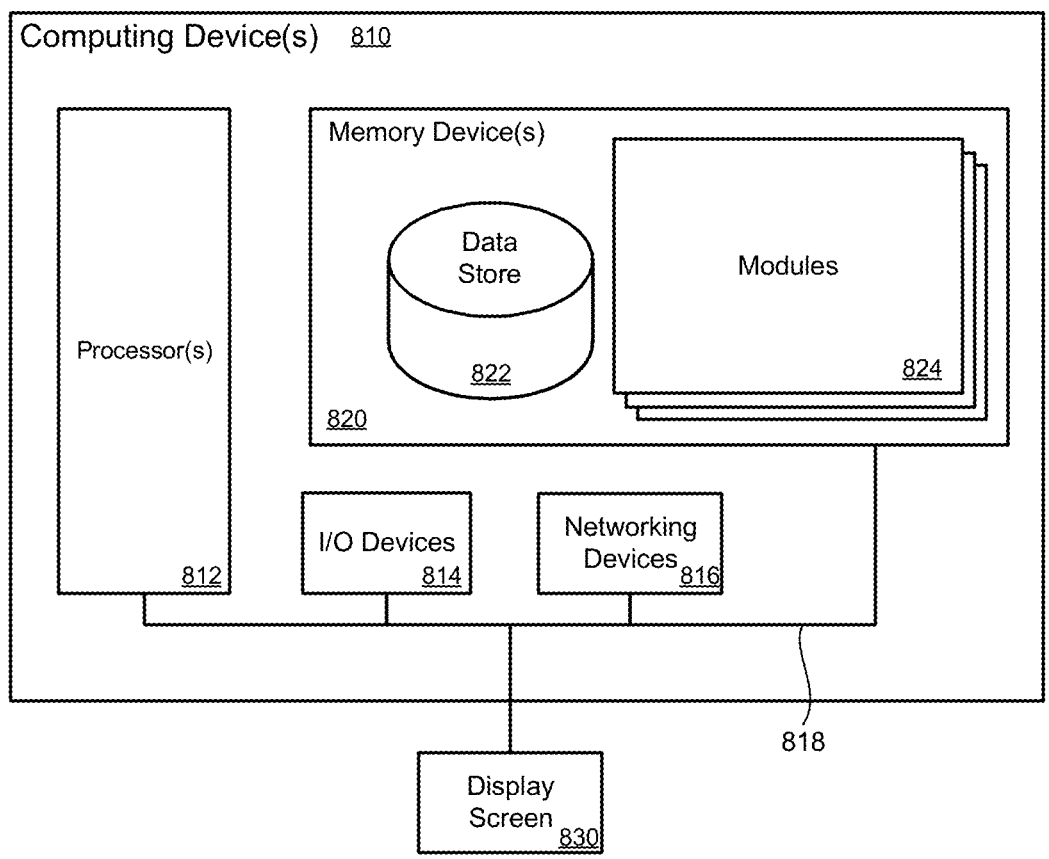
FIG. 8 is block diagram illustrating an example of a computing device that may be used to execute a method for tomographic reconstruction of a three-dimensional object using multi-scale decomposition and multi-scale reconstruction.

FIG. 8 illustrates a computing device 810 on which service modules of this technology can execute. A computing device 810 is illustrated on which a high level example of the technology can be executed. The computing device 810 can include one or more processors 812 that are in communication with memory devices 820. The computing device 810 can include a local communication interface 818 for the components in the computing device. For example, the local communication interface 818 can be a local data bus and/or any related address or control busses as may be desired.

The memory device 820 can contain modules 824 that are executable by the processor(s) 812 and data for the modules 824 to provide various services. In one aspect, the memory device 820 can include an image decomposition module, a reconstruction module, a multi-scale reconstruction module, an image display module, and other modules. A data store 822 can also be located in the memory device 820 for storing data related to the modules 824 and other applications along with an operating system that is executable by the processor(s) 812.

Other applications can also be stored in the memory device 820 and can be executable by the processor(s) 812. Components or modules discussed in this description that can be implemented in the form of software using high-level programming languages that are compiled, interpreted or executed using a hybrid of the methods.

The computing device can also have access to I/O (input/output) devices 814 that are usable by the computing devices. An example of an I/O device is a display screen 830 that is available to display output from the computing device 810. Networking devices 816 and similar communication devices can be included in the computing device. The networking devices 816 can be wired or wireless networking devices that connect to the internet, a LAN, WAN, or other computing network.

The components or modules that are shown as being stored in the memory device 820 can be executed by the processor(s) 812. The term "executable" may mean a program file that is in a form that can be executed by a processor 812. For example, a program in a higher level language can be compiled into machine code in a format that can be loaded into a random access portion of the memory device 820 and executed by the processor 812, or source code can be loaded by another executable program and interpreted to generate instructions in a random access portion of the memory to be executed by a processor. The executable program can be stored in any portion or component of the memory device 820. For example, the memory device 820 can be random access memory (RAM), read only memory (ROM), flash memory, a solid state drive, memory card, a hard drive, optical disk, floppy disk, magnetic tape, or any other memory components.

The processor 812 can represent multiple processors, including, but not limited to Central Processing Units (CPUs), Graphical Processing Units (GPU), FPGAs, quantum computers, or clusters of the above, and the memory device 820 can represent multiple memory units that operate in parallel to the processing circuits. This can provide parallel processing channels for the processes and data in the system. The local communication interface 818 can be used as a network to facilitate communication between any of the multiple processors and multiple memories. The local communication interface 818 can use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors, such as CPUs or GPUs, mixed environments and clusters. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described herein may also be stored on a computer readable storage medium that includes volatile and non-volatile, removable and non-removable media implemented with any technology for the storage of information such as computer readable instructions, data structures, program modules, or other data. Computer readable storage media include, but is not limited to, a non-transitory machine readable storage medium, such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. An imaging system, comprising:
   at least one memory device including instructions that, when executed by at least one processor, cause the imaging system to:
   receive a projection image dataset generated by at least one imaging data detector in response to detecting image data to allow for generating reconstruction image data of a three-dimensional object using a reconstruction technique;
   generate a reduced image dataset from the projection image dataset, wherein the reduced image dataset has a lower quantity of data as compared to a quantity of data of the projection image dataset received from the at least one imaging data detector;
   generate an image remainder dataset to indicate an image difference between the projection image dataset and the reduced image dataset; and
   perform the reconstruction technique to generate the reconstruction image data for the three-dimensional object, including at least:
   generating a first scale image reconstruction of the three-dimensional object using the reduced image dataset;
   causing the first scale image reconstruction to be displayed to a display device;
   generating at least a second scale image reconstruction of the three-dimensional object using the image remainder dataset to increase a resolution of the reconstruction image data as compared to a resolution of the first scale image reconstruction; and
   causing at least the second scale image reconstruction to be displayed to the display device.

2. The imaging system in claim 1, wherein the reconstruction technique further includes: a multi-scale image recombination of the three-dimensional object using the first scale image reconstruction and at least the second scale image reconstruction which is used for display to the display device.

3. The imaging system in claim 1, where both of the first and second scale image reconstructions are provided as an input to a computer vision algorithm or to a robot.

4. The imaging system in claim 1, wherein the reduced image dataset is encoded using a data compression technique.

5. The system in claim 1, wherein the image remainder dataset is encoded using a data compression technique.

6. The imaging system in claim 1, wherein the first scale image reconstruction and the second scale image reconstruction are generated in parallel.

7. The imaging system in claim 1, wherein generating the first scale image reconstruction of the three-dimensional object includes:
forward projecting a ground truth image volume to produce a two-dimensional set of projection images;
determining a difference between the projection image dataset and the two-dimensional set of projection images;
generating an update volume by back projecting the difference into a three-dimensional space; and
incorporating the update volume into a reconstruction of the image of the three-dimensional object.

8. The imaging system in claim 1, wherein generating the first scale image reconstruction of the three-dimensional object includes applying a density constraint to the first scale image reconstruction.

9. The imaging system in claim 1, wherein generating the second scale image reconstruction includes increasing a resolution of a region of interest within the second scale image reconstruction of the three-dimensional object.

10. The system in claim 1, wherein the second scale image reconstruction of the three-dimensional object is of higher depth as compared to the depth of the first scale image reconstruction.

11. The imaging system in claim 1, wherein the second scale image reconstruction of the three-dimensional object is a same resolution as the first scale image reconstruction, and the second scale image reconstruction is shifted in position to create an interleaved volume with the first scale image reconstruction to increase the resolution of the reconstruction image data.

12. The imaging system of claim 1, wherein the projection image dataset is a subset of image data of the three-dimensional object, and the reconstruction technique uses subsets of the image data to incrementally increase the resolution of the reconstruction image data.

13. The imaging system in claim 1, wherein the memory device further includes instructions that, when executed by the at least one processor, cause the system to send the reduced image dataset and the image remainder dataset to a remote data center that has computing resources configured to perform the reconstruction technique to generate the reconstruction image data for the three-dimensional object.

14. The imaging system of claim 1, wherein the reconstruction technique is an iterative reconstruction technique or a filtered backprojection technique.

15. The imaging system of claim 1, wherein the projection image dataset is generated by x-rays or by magnetic resonance.

16. A computer implemented method, comprising:
receiving, from a client, a reduced image dataset at a data center that has computing resources to perform a reconstruction technique to generate reconstruction image data for a three-dimensional object, wherein the reduced image dataset is generated from a projection image dataset obtained from at least one imaging data detector configured to receive x-ray radiation from at least one radiation source, and the reduced image dataset has a lower quantity of data as compared to a resolution of the projection image dataset;
initiating, using the reconstruction technique, a first scale image reconstruction of the three-dimensional object using the reduced image dataset;
causing the first scale image reconstruction of the three-dimensional object to be displayed to a display device;
receiving, from the client, an image remainder dataset that indicates an image resolution difference between the projection image dataset and the reduced image dataset;
initiating a second scale image reconstruction of the three-dimensional object using the image remainder dataset to refine image reconstruction of the three-dimensional object;
causing the second scale image reconstruction of the three-dimensional object to be displayed to the display device, wherein the second scale image reconstruction provides a higher-resolution view of the three-dimensional object as compared to resolution of the first scale image reconstruction;
initiating a multi-scale image reconstruction of the three-dimensional object using the first scale image reconstruction and the second scale image reconstruction to further refine the image reconstruction of the three-dimensional object; and
causing the multi-scale image reconstruction of the three-dimensional object to be displayed to the display device, wherein the multi-scale image reconstruction provides a higher-resolution view of the three-dimensional object as compared to resolution views of the first scale image reconstruction and the second scale image reconstruction.

17. The method in claim 16, wherein the first scale image reconstruction and the second scale image reconstruction of the three-dimensional object are performed in parallel using the computing resources of the data center.

18. The method in claim 16, further comprising:
sending the first scale image reconstruction of the three-dimensional object to the client for display to a the display device directly after generating the first scale image reconstruction; and
sending the second scale image reconstruction of the three-dimensional object to the client for display to the display device directly after generating the second scale image reconstruction.

19. The method in claim 16, wherein causing the multi-scale image reconstruction of the three-dimensional object to be displayed to the display device further comprises sending the multi-scale image reconstruction to the client which is configured to display the multi-scale image reconstruction to the display device.

20. The method in claim 16, wherein causing the multi-scale image reconstruction of the three-dimensional object to be displayed to the display device further comprises sending a render of the multi-scale image reconstruction to the client for display to the display device.

21. The method of claim 16, wherein the projection image dataset includes an ordered subset of projection image data generated by the at least one imaging data detector to allow reconstruction of the three-dimensional object to start prior to receiving a complete set of projection images.

22. An imaging system, comprising:
at least one memory device including instructions that, when executed by at least one processor, cause the imaging system to:
- receive a projection image dataset generated by at least one imaging data detector in response to detecting imaging data to allow for generating reconstruction image data of a three-dimensional object using a reconstruction technique;
- perform the reconstruction technique to generate the reconstruction image data of the three-dimensional object, including at least:
  - generating a first scale image reconstruction of the three-dimensional object from a reduced image dataset that has a lower quantity of data as compared to a quantity of data of the of the projection image dataset;
  - causing the first scale image reconstruction to be displayed to a display device;
  - generating a second scale image reconstruction of the three-dimensional object using an image remainder dataset that indicates an image difference between the of the projection image dataset and the reduced image dataset to increase a resolution of the reconstruction image data as compared to a resolution of the first scale image reconstruction; and
  - causing the second scale image reconstruction to be displayed to the display device.

23. The system of claim 22, wherein the at least one memory device further includes instructions that, when executed by the at least one processor, cause the system to:
- generate the reduced image dataset to include the lower quantity of data in order to reduce a latency associated with sending the reduced image dataset to a remote data center; and
- send the reduced image dataset over a network to the remote data center which has computing resources configured to perform the reconstruction technique.

24. The system of claim 22, wherein both the first and second scale image reconstructions are provided as an input to a computer vision algorithm.

25. The system of claim 22, wherein the reconstruction image data is a subset of data of a region of interest in higher resolution and in higher image depth.

26. The system of claim 22, wherein the image remainder dataset is generated as the image difference between the projection image dataset and a forward projection of the first scale reconstruction of the three dimensional object.

* * * * *